United States Patent Office 3,493,626
Patented Feb. 3, 1970

3,493,626
PROCESS FOR THE DECHLORINATION OF MIXTURES OF 2-CHLORO-m-XYLENE AND 4-CHLORO-m-XYLENE
Hermann Zorn, 4 Ploesslgasse, Vienna 4, Austria, and Otto Hinterhofer, Vienna, Austria; said Hinterhofer assignor to said Zorn
No Drawing. Filed July 9, 1968, Ser. No. 743,326
Claims priority, application Austria, July 11, 1967, A 6,462/67
Int. Cl. C07c 15/08
U.S. Cl. 260—668                          7 Claims

ABSTRACT OF THE DISCLOSURE

The present invention relates to selectively dechlorinating a mixture of 2-chloro-m-xylene and 4-chloro-m-xylene with hydrogen in two steps, comprising the use of a nickel or cobalt catalyst to dechlorinate the 4-chloro component in the first step and of a platinum or palladium catalyst to declorinate the 2-chloro component in the second step.

---

The co-pending patent application Ser. No. 509,205, now U.S. Patent No. 3,423,478, relates to a process for the separation of an aromatic $C_8$-hydrocarbon-fraction which contains m- and p-xylene and ethyl benzene, and consists essentially of treating said fraction in substantially anhydrous formic acid with a chlorinating agent and separating that portion of the fraction which had not reacted with the chlorinating agent by distillation from the resulting chlorination product of the m-xylene, whereupon, in order to obtain m-xylene in a pure condition, the chlorination product may be dehalogenated and, if desired, isomerized.

It is an object of the present invention to improve and further develop that step of the process which consists in the dehalogenation of the resulting chloro-m-xylenes, i.e. of a mixture containing 2-chloro-m-xylene and 4-chloro-m-xylene for the purpose of recovering pure m-xylene.

It has been proposed in the co-pending patent application that the monochlorination product in gaseous condition may be passed together with hydrogen (in abundance) over a nickel or platinum catalyst without pressure at a temperature of about 250 to 300° C., a complete recovery of pure m-xylene is, however, not possible in this way. It has now been found that the difficulties existing so far may be overcome and that the chlorination products may be converted into pure m-xylene by separating impurities which might still be contained in the mixture, if the declorination of 2-chloro-m-xylene and 4-chloro-m-xylene is carried out selectively.

The process of the invention comprises selectively dechlorinating the mixture in two steps, the first step thereof consisting in the conversion of 4-chloro-m-xylene into m-xylene by using nickel or cobalt, or oxides thereof, as catalysts, the second step consisting in the conversion of 2-chloro-m-xylene into m-xylene by using platinum or palladium as catalysts.

Preferably the declorination of 4-chloro-m-xylene in the first step takes place at a temperature ranging between 330 and 370° C., if desired under increased pressure, the dechlorination of 2-chloro-m-xylene in the second step at a temperature between 350 and 400° C., when platinum is used as a catalyst, and between 190 and 240° C., when palladium is used as a catalyst, again under increased pressure, if desired. As carriers for the catalysts synthetic or natural silicates, aluminum silicates with low aluminum contents, activated carbon, pumice or asbestos or, if desired, tungsten-or molybdenum oxide may be used; for nickel or nickel oxide as a catalyst preferably silica gel and for platinum or palladium as a catalyst preferably activated carbon are used.

The process according to the invention is illustrated in more detail in the following examples:

EXAMPLE 1

A mixture of 30% 2-chloro-m-xylene and 70% 4-chloro-m-xylene in vapor condition is passed together with hydrogen over a catalyst consisting of 15 parts nickel activated in the hydrogen cycle at 500° C. on 100 parts silica gel (granulation ASTM 20). The temperature is kept at 350° C. The mole ratio between the chloro-m-xylenes and hydrogen ranges between 1:4 and 1:8. After the reaction is completed the reaction product is condensed and a mixture of 70% m-xylene and 29% 2-chloro-m-xylene is obtained, as seen from the gas chromatographic analysis. Traces of toluene and 4-chloro-m-xylene are present. The mixture is then separated by distillation and the resulting 2-chloro-m-xylene is converted into m-xylene by using a platinum catalyst. The catalyst is deposited by formaldehyde reduction on granulated activated carbon with a granulation of 2.5–3 mm. The platinum amount ranges between 7 and 10% by weight. The mole ratio between 2-chloro-m-xylene and hydrogen ranges from 1:3 to 1:6, the optimum temperature is $385\pm5°$ C. The dechlorination reaction is almost quantitative. The m-xylene obtained contains less than 0.2% 2-chloro-m-xylene.

EXAMPLE 2

A mixture of 30% 2-chloro-m-xylene and 70% 4-chloro-m-xylene in gaseous conditions is passed together with hydrogen (in abundance) over a nickel catalyst. The catalyst consists of nickel activated at 550° C. on molybdenum oxide with a granulation of 1.5–3 mm. The amount of nickel ranges between 18 and 20 g./100 g. $MoO_3$. The ratios between chloro-m-xylene and hydrogen are the same as in Example 1. The temperature is kept at 340° C. After condensation of the reaction product a mixture containing 69% m-xylene and 29% 2-chloro-m-xylene is obtained. What remains are traces of 4-chloro-m-xylene, toluene, chloro-toluenes and trimethyl benzenes. After separation of m-xylene the 2-chloro-m-xylene is converted into m-xylene by using a platinum catalyst. The temperature is 370–380° C.

EXAMPLE 3

A mixture of 30% 2-chloro-m-xylene and 70% 4-chloro-m-xylene in gaseous condition is passed together with hydrogen (in abundance) over a nickel-pumice catalyst under normal pressure. The catalyst contains 4 parts nickel on 100 parts pumice. The ratios between chloro-m-xylene and hydrogen are the same as in Example 1. The temperature is 350° C. After condensation of the reaction product a mixture of 70% m-xylene and 29% 2-chloro-m-xylene is obtained, which is separated by distillation. The processing of 2-chloro-m-xylene takes place by using a palladium catalyst, which has been produced by reduction and deposition of palladium by means of formaldehyde or boron hydride on activated carbon. The palladium amounts to 5%. The reaction takes place at a temperature of 200° C. It is a complete reaction.

What we claim is:
1. A process of dechlorinating a mixture of 2-chloro-m-xylene and 4-chloro-m-xylene with hydrogen in the presence of a catalyst selected from the metals of Group VIII of the Periodic System and oxides thereof, and at an increased temperature, comprising subjecting said mixture to a two-step selective dechlorination treatment, a catalyst selected from nickel and cobalt and oxides thereof being employed in the first step to convert 4-chloro-m-xylene into m-xylene, and a catalyst selected from platinum and palladium being employed in the second step to convert 2-chloro-m-xylene into m-xylene.

2. The process set forth in claim 1 wherein the dechlorination of 4-chloro-m-xylene in said first step is carried out at a temperature between 330 and 370° C.

3. The process set forth in claim 1 wherein the dechlorination of 2-chloro-m-xylene in said second step is carried out at a temperature between 350 and 400° C. when using a platinum catalyst, and at a temperature between 190 and 240° C., when using a palladium catalyst.

4. The process set forth in claim 1 wherein said steps of selective dechlorination are carried out under increased pressure.

5. The process set forth in claim 1 wherein the catalysts used are deposited on carrier materials selected from the group comprising synthetic silicates, natural silicates, aluminum silicates having low aluminum contents, activated carbon, pumice, asbestos, tungsten oxide and molybdenum oxide.

6. The process set forth in claim 1 wherein said nickel and nickel oxide catalysts employed are deposited on a silica gel carrier.

7. The process set forth in claim 1 wherein said platinum and palladium catalysts employed are deposited on activated carbon.

References Cited

UNITED STATES PATENTS

| | | | |
|---|---|---|---|
| 2,977,395 | 3/1961 | Schaeffer et al. | 260—668 |
| 3,075,021 | 1/1963 | Luvisi et al. | 260—668 X |
| 3,110,742 | 11/1963 | Howk | 260—668 |

DELBERT E. GANTZ, Primary Examiner

C. R. DAVIS, Assistant Examiner

U.S. Cl. X.R.

260—650